April 11, 1939.   J. B. BRENNAN   2,154,027
ELECTROLYTIC DEVICE AND METHOD OF MAKING SAME Filed Oct. 13, 1934

Inventor
JOSEPH B. BRENNAN

By Richey & Watts
Attorneys

Patented Apr. 11, 1939

2,154,027

UNITED STATES PATENT OFFICE 2,154,027

ELECTROLYTIC DEVICE AND METHOD OF MAKING SAME

Joseph B. Brennan, Fort Wayne, Ind.

Application October 12, 1934, Serial No. 748,247

7 Claims. (Cl. 148—8)

This invention relates to electrolytic devices and methods of making the same, and more particularly to methods of making filmed electrodes for use in electrolytic condensers, rectifiers, lightning arresters and similar devices. Insofar as common subject matter is concerned, this application is a continuation of my applications Serial Nos. 673,772 and 707,149, filed May 31, 1933, and January 18, 1934, respectively. Reference is hereby made to my application Ser. No. 738,804, filed August 7, 1934.

It is among the objects of my invention to secure filmed electrodes having desirable electrical characteristics such as low resistance and low power factor loss as well as an increased capacity per unit of plane area as compared to prior types of electrodes. Another object of my invention is to provide a method for forming the film on electrodes whereby a durable, uniform film may be produced having good electrical characteristics and having an increased capacity per unit of plane area of the electrode.

Further objects and advantages of my invention will become apparent from the following description of preferred forms thereof, particularly as applied to the production of anodes for electrolytic condensers of aluminum of high purity and preferably containing a maximum of .02% of copper.

Figure 1:
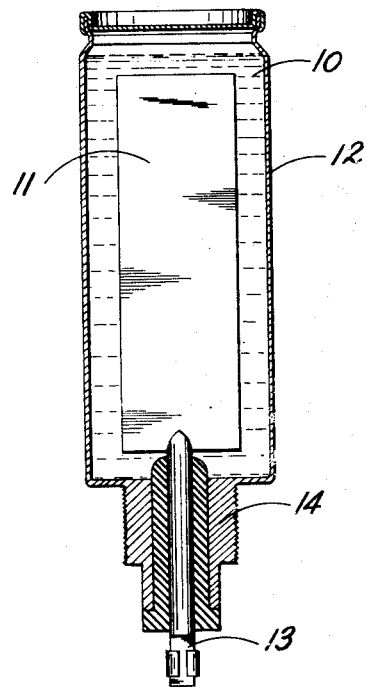
Figure 2:
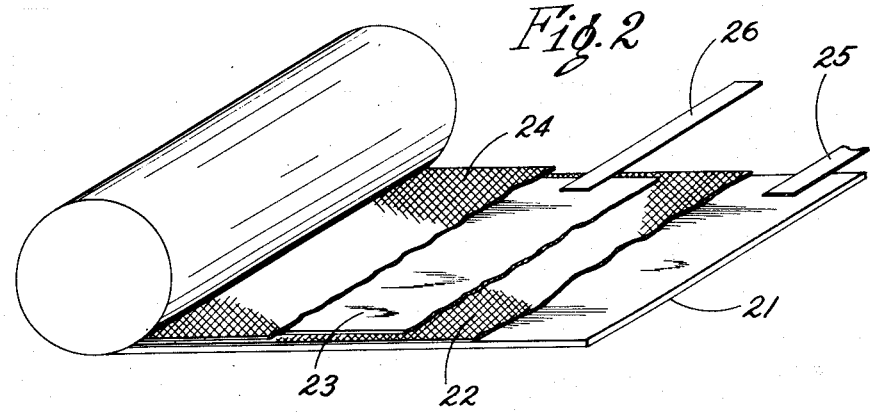

In the drawing, Figure 1 illustrates a transverse section through a liquid type of condenser embodying my invention, and Figure 2 illustrates my invention as applied to a condenser of the type embodying a paste electrolyte, parts of the condenser being broken away.

According to my invention, I etch the surface of the film forming material comprising the electrode or anode in a manner to be hereinafter disclosed and thereby I produce a finely roughened surface on the anode. This results in an increase of area of anode exposed to an electrolyte as compared to the plane area of the anode, and upon subsequent formation of the dielectric film the area of the film is correspondingly increased with relation to the plane area of the anode, for the dielectric film conforms in contour to the contour of the finely roughened anode surface. Because of the increase in area in the dielectric film, the capacity of the anode is increased, and I find that by my method I can increase the capacity of an anode from two to four times per unit of plane area as compared to an anode of similar material, but which has not been treated to produce a finely roughened surface.

In carrying out my process as applied to aluminum of 99.7% purity, such as is usually employed in the manufacture of electrolytic condensers, and which ordinarily contains a maximum of .02% of copper, I preferably first wash the aluminum in a 5% solution of borax to remove grease and other surface impurities therefrom, and thereafter carry out the etching operation. As an example, I have successfully etched aluminum with excellent results using a solution of the following composition:

Water_____c. c.___ 80.5
Hydrochloric acid_____c. c.___ 8.9
Nickel chloride_____grams__ 22

The aluminum is immersed in the above solution for a period of about one to two minutes, although a longer or shorter period can be employed depending upon the depth of etch desired. Then it is removed from the solution and rinsed successively in cold distilled water, a 20% solution of nitric acid, cold distilled water, a 2% solution of an alkali such as sodium hydroxide and finally thoroughly rinsed in boiling distilled water.

The above treatment accomplishes a deep eaching and thorough cleaning of the aluminum so that there is a considerable increase in the active area exposed to the electrolyte in the subsequent formation of the dielectric film, and so that the aluminum is provided with a finely roughened surface.

After the etching and cleaning operations have been carried out, the dielectric film may then be formed electrolytically, preferably by immersing the plate in an electrolyte comprising an aqueous solution of borax and boric acid, and causing a unidirectional current to flow therethrough, the positive pole of the source of current being connected to the anode plate. The voltage is regulated so that the initial current will be about two amperes per ultimate mfd. to be developed on the finally formed plate. As the dielectric film is gradually formed, the flow of current decreases to about 0.25 milliampere or less per mfd. under a potential of about 700 volts. During the forming operation, I prefer that the temperature of the electrolyte be maintained at about 90° C., and the forming operation may be completed in from an hour to an hour and a half.

During the forming operation, the electrolyte contacts with the entire exposed area of the finely roughened plate. Thus a dielectric film is formed on the surface of the plate which conforms substantially throughout to the contour of the finely roughened surface, and which has irregularities of a like order to those on the anode surface. Because of this roughness or irregularity, the exposed surface of the dielectric film is considerably greater in area than the plane area of the plate surface.

Plates produced according to my invention and formed as described above will successfully withstand operating potentials of more than 400 volts and I am able to obtain specific capacities in excess of .08 mfd. per square centimeter. The treatment outlined above may be applied to thin aluminum foil or to metallic forms or fabricated electrodes. Likewise, the treatment in substantially the manner outlined above may be applied to other film forming metals such as tantalum or magnesium. I have also applied my process of treatment to cathodes used in electrolytic condensers. It is also contemplated that where aluminum is used, the foil may be run continuously through successive etching, cleaning and forming baths.

After the forming operation has been completed, the plates may be incorporated in electrolytic condensers or similar devices of any well known constructions, such as the types of condensers illustrated in the drawing. In Figure 1 of the drawing, I have illustrated my invention as applied to a condenser of a well known type having a liquid electrolyte 10 in which the aluminum anode 11, preferably containing not more than .02% of copper and made according to my invention, is immersed. The electrolyte is contained within a can 12 which also serves as the cathode of the condenser. The anode is supported within the container 12 by means of the rod or strip 13 which passes through and is insulated from the neck 14 of the container, the support 13 serving as the terminal for the anode.

In Figure 2 of the drawing, I have illustrated my invention as applied to a condenser of a type embodying a paste electrolyte. In this type of condenser, the plates may comprise strips 21 and 23 of aluminum foil preferably containing not more than .02% of copper, and treated and formed as described herein, rolled together to form a compact condenser. The plates are separated by strips 22 and 24 of absorbent gauze or other suitable material, which strips are impregnated with a suitable paste electrolyte such as the film maintaining ethylene glycol electrolyte disclosed in the Ruben Patent No. 1,891,207. The terminals for the plates may be formed by metallic strips 25 and 26 suitably secured to the plates 21 and 23, respectively, and if desired the completed condenser may be sealed within a suitable casing.

I have found that other solutions of acidified salts may be employed for the etching operation. For example, I have obtained good results by employing the following solutions:

| | | |
|---|---|---|
| Water | c. c. | 100 |
| Hydrochloric acid | c. c. | 100 |
| Copper chloride | grams | 10 |
| Water | c. c. | 100 |
| Hydrochloric acid | c. c. | 100 |
| Iron chloride | grams | 10 |
| Water | c. c. | 100 |
| Hydrochloric acid | c. c. | 100 |
| Manganese sulphate | grams | 8 |

It is to be understood that the proportions of the different materials in the solutions may be varied and the temperatures of the salt solutions controlled in order to control the speed of the etching operation.

Various other salts, such as stannous chloride, can be used successfully, but I prefer to employ salts of metals which are below aluminum in the electro-chemical series, so that aluminum will go into solution during the etching operations, while the other metal employed will be deposited on the anode plate. The metal so deposited then is removed by the subsequent acid and alkaline baths, and apparently carries various other impurities with it as it is being removed.

The etching greatly increases the capacity of my condensers per unit of anode area and produces an efficient condenser having low power factor and resistance losses.

The above examples are given by way of illustrating some of the etching solutions which I have used in securing the results desired, it being understood, however, that my invention is not restricted to the precise manipulations and materials herein specified.

I claim:

1. The process of preparing high purity aluminum electrodes for electrolytic condensers which comprises cleaning the aluminum in a solution of borax, providing the aluminum with a roughened surface and removing metallic surface impurities therefrom by etching the aluminum in a solution of a salt of a metal below aluminum in the electro-chemical series, said solution being acidified by hydrochloric acid, thereafter dissolving the impurities deposited on the aluminum in the etching bath by immersing the aluminum in a solution of nitric acid, and washing the aluminum to remove the nitric acid.

2. The process of treating high purity aluminum electrodes for electrolytic condensers preparatory to forming a dielectric film thereon which includes the steps of cleaning the aluminum in a solution of borax, then roughening the surface of the aluminum and removing metallic surface impurities therefrom by etching the aluminum in a solution of a salt of a metal below aluminum in the electro-chemical series, said solution being acidified by hydrochloric acid, thereafter dissolving the impurities deposited on the aluminum in the etching bath by immersing the aluminum in nitric acid, and washing the aluminum to remove the nitric acid prior to the formation of a dielectric film thereon.

3. The method of increasing the effective surface area of electrodes of high purity aluminum for electrolytic condensers which includes the steps of successively immersing the aluminum in a cleansing solution, subjecting the aluminum to the action of a solution of copper chloride, the solution being acidified by the addition of a small amount of hydrochloric acid, until the surface thereof is deeply etched, and immersing the aluminum in a solution of nitric acid to remove any deposit formed thereon in the metallic salt solution, whereby the aluminum is thoroughly cleaned and the effective surface area of the aluminum is greatly increased.

4. In the manufacture of aluminum electrodes for electrolytic condensers, the step of subjecting the aluminum to the etching action of a solution of copper chloride and hydrochloric acid in water.

5. The process of preparing high purity aluminum electrodes for electrolytic condensers which comprises cleaning the aluminum in a solution of borax, providing the aluminum with a roughened surface and removing metallic surface impurities therefrom by etching the aluminum in a solution of salt of nickel, said solution being acidified by hydrochloric acid, thereafter dissolving the impurities deposited on the aluminum in the etching bath by immersing the aluminum in a solution of nitric acid, and washing the aluminum to remove the nitric acid.

6. The process of preparing high purity aluminum electrodes for electrolytic condensers which comprises cleaning the aluminum in a solution of borax, providing the aluminum with a roughened surface and removing metallic surface impurities therefrom by etching the aluminum in a solution of salt of copper, said solution being acidified by hydrochloric acid, thereafter dissolving the impurities deposited on the aluminum in the etching bath by immersing the aluminum in a solution of nitric acid, and washing the aluminum to remove the nitric acid.

7. The process of preparing high purity aluminum electrodes for electrolytic condensers which comprises cleaning the aluminum in a solution of borax, providing the aluminum with a roughened surface and removing metallic surface impurities therefrom by etching the aluminum in a solution of salt of manganese, said solution being acidified by hydrochloric acid, thereafter dissolving the impurities deposited on the aluminum in the etching bath by immersing the aluminum in a solution of nitric acid, and washing the aluminum to remove the nitric acid.

JOSEPH B. BRENNAN.